(12) United States Patent
Larson et al.

(10) Patent No.: US 10,578,213 B2
(45) Date of Patent: Mar. 3, 2020

(54) STEERING ASSEMBLY WITH DUAL WALL BOOT

(71) Applicant: GM GLOBAL TECHNOLOGY OPERATIONS LLC, Detroit, MI (US)

(72) Inventors: Travis S. Larson, Sterling Heights, MI (US); George E. Doerr, Davisburg, MI (US); Miroslaw Zaloga, Shelby Township, MI (US); John T. Zuzelski, Clarkston, MI (US); David Juarez, Grosse Pointe Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 15/829,083

(22) Filed: Dec. 1, 2017

(65) Prior Publication Data

US 2019/0170251 A1 Jun. 6, 2019

(51) Int. Cl.
| F16J 3/04 | (2006.01) |
| B62D 3/12 | (2006.01) |
| F16D 3/84 | (2006.01) |
| B62D 5/04 | (2006.01) |

(52) U.S. Cl.
CPC ............... *F16J 3/041* (2013.01); *B62D 3/12* (2013.01); *F16D 3/845* (2013.01); *B62D 5/04* (2013.01)

(58) Field of Classification Search
CPC . B62M 6/30; B62M 6/25; B62M 7/02; B62M 7/04; B62M 23/02

USPC .................................................. 180/205.2
See application file for complete search history.

(56) References Cited

U.S. PATENT DOCUMENTS

| 3,381,987 | A | * | 5/1968 | Husen | ................. | F16C 11/0671 |
| | | | | | | 277/635 |
| 5,145,191 | A | * | 9/1992 | Stewart | ................... | F16D 3/845 |
| | | | | | | 277/636 |
| 6,056,297 | A | * | 5/2000 | Harkrader | ................ | F16J 3/041 |
| | | | | | | 277/634 |
| 7,641,561 | B2 | * | 1/2010 | Moriyama | .......... | B60R 13/0846 |
| | | | | | | 280/780 |
| 8,469,399 | B2 | * | 6/2013 | Allen | ................... | F16J 15/3224 |
| | | | | | | 277/630 |
| 9,845,872 | B2 | * | 12/2017 | Dunning | ................ | F16D 3/845 |

FOREIGN PATENT DOCUMENTS

JP            2012240435 A    * 12/2012

* cited by examiner

*Primary Examiner* — Joseph M Rocca
*Assistant Examiner* — Felicia L. Brittman
(74) *Attorney, Agent, or Firm* — Quinn IP Law

(57) ABSTRACT

A steering assembly for a vehicle includes a steering gear including a steering gear housing enclosing a steering rack, the steering rack coupled to a tie rod at a joint, at least one boot assembly configured to enclose the joint between the steering rack and the tie rod. The at least one boot assembly includes a first boot proximate to the joint and a second boot disposed outward of the first boot. The first and second boots define a void therebetween.

14 Claims, 4 Drawing Sheets

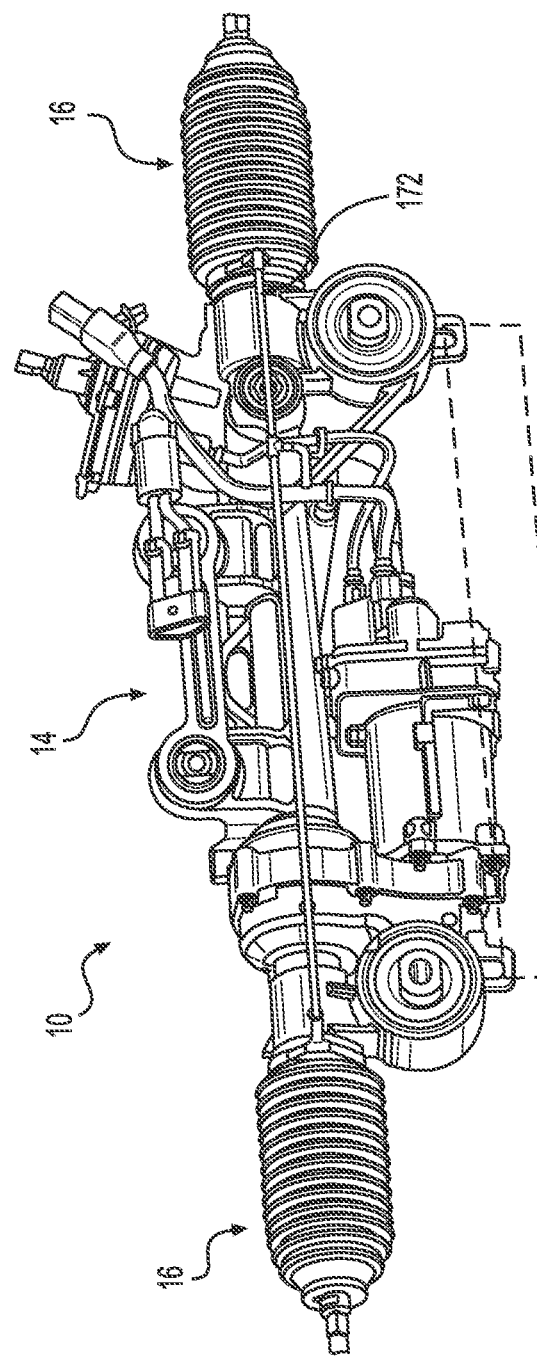
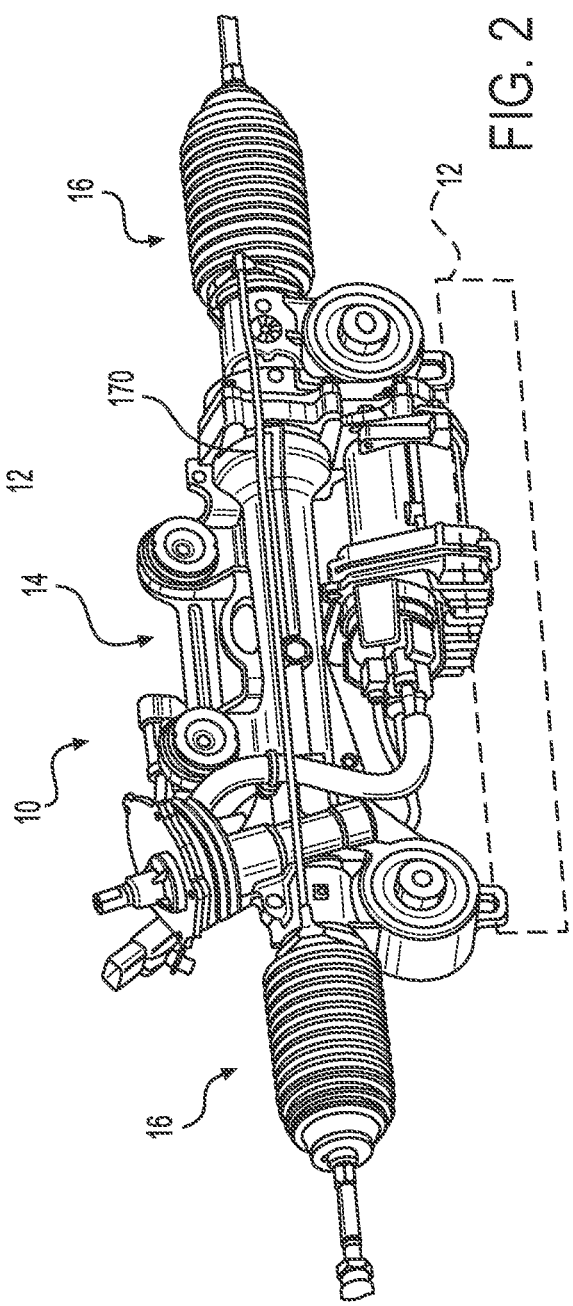

STEERING ASSEMBLY WITH DUAL WALL BOOT

INTRODUCTION

The present invention relates generally to the field of vehicles and, more specifically, to steering assemblies for motor vehicles.

A steering gear rack boot is an expandable member that creates a seal over the joint between a rack and pinion gear of the steering gear housing and the tie rod end of a steering gear assembly. Current steering gear rack boots can fail, allowing for intrusion of water and other contaminants into the joint.

SUMMARY

Embodiments according to the present disclosure provide a number of advantages. For example, embodiments according to the present disclosure enable additional protection of the steering gear joint and detection of anomalous conditions within the steering gear rack boot, such as an intrusion of water or other contaminants.

In one aspect, a steering assembly for a vehicle includes a steering gear including a steering gear housing enclosing a steering rack, the steering rack coupled to a tie rod at a joint and at least one boot assembly configured to enclose the joint between the steering rack and the tie rod. In some aspects, the at least one boot assembly includes a first boot proximate to the joint and a second boot disposed outward of the first boot. In some aspects, the first and second boots define a void therebetween.

In some aspects, the steering assembly further includes a first boot assembly and a second boot assembly, and an air transfer member fluidly connecting the first boot assembly and the second boot assembly.

In some aspects, the first boot assembly includes a first boot and a second boot defining a first void of the first boot assembly and the second boot assembly includes a third boot and a fourth boot defining a second void of the second boot assembly and the air transfer member fluidly connects the first and second voids of the first and second boot assemblies.

In some aspects, the steering assembly further includes a material disposed within the void, the material configured to increase in viscosity when exposed to moisture.

In some aspects, the steering assembly further includes a sensing assembly, the sensing assembly including a sensor disposed within the void between the first and second boots of the at least one boot assembly.

In some aspects, the sensing assembly is electrically coupled to an electronic control unit of an electric power steering system.

In some aspects, the first boot includes a first end coupled to the tie rod and a second end coupled to the steering gear housing.

In some aspects, the first end of the first boot has a snap fit engagement with the tie rod and the second end of the first boot has a snap fit engagement with an engagement portion of the steering gear housing.

In some aspects, the first boot is offset from the second boot along a longitudinal axis defined by the steering gear.

In some aspects, a first end of the first boot and a first end of the second boot are radially aligned and a second end of the first boot and a second end of the second boot are radially aligned.

In another aspect, a steering assembly for a motor vehicle includes a steering gear including a steering rack coupled to a tie rod at a joint and at least one boot assembly configured to enclose the joint between the steering rack and the tie rod. The at least one boot assembly includes a first boot proximate to the steering rack, a second boot disposed outward of the first boot such that a space is defined between the first and second boots, and a sensing assembly disposed in the space between the first boot and the second boot. In some aspects, the sensing assembly includes a sensor configured to detect a moisture level in the space between the first and second boots.

In some aspects, the steering assembly further includes a first boot assembly and a second boot assembly and an air transfer member fluidly connecting the first boot assembly and the second boot assembly.

In some aspects, the steering assembly further includes a material disposed within the space between the first boot and the second boot of the at least one boot assembly, the material configured to increase in viscosity when exposed to moisture.

In some aspects, a first end of the first boot has a snap fit engagement with the tie rod and a second end of the first boot has a snap fit engagement with an engagement portion of the steering gear housing.

In some aspects, the sensor is electrically coupled to an electronic control unit of an electric power steering system.

BRIEF DESCRIPTION OF THE DRAWINGS

The present disclosure will be described in conjunction with the following figures, wherein like numerals denote like elements.

FIG. 1 is a schematic side view of a steering assembly for a vehicle, according to an embodiment.

FIG. 2 is a schematic view of the opposite side of the steering assembly shown in FIG. 1.

Figure 3:
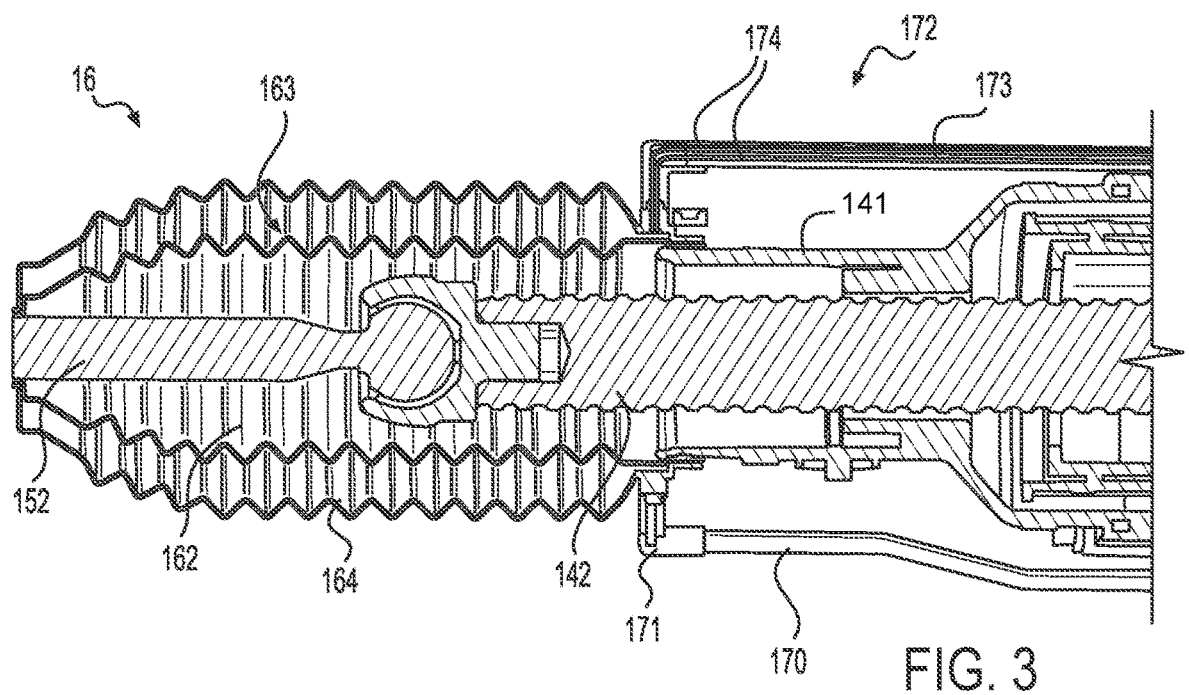
FIG. 3 is a schematic, cross-sectional view of a portion of the steering assembly of FIGS. 1 and 2, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to the drawings, wherein like reference numbers correspond to like or similar components whenever possible throughout the several figures, there is shown in FIGS. 1 and 2 a portion of a vehicle (not numbered). In particular, FIGS. 1 and 2 illustrate a steering assembly 10 for the vehicle. A frame 12 is schematically shown in FIGS. 1 and 2 and broadly illustrates the structural chassis elements to which the steering assembly 10 is mounted.

A rack and pinion steering gear 14 translates rotational movement of a steering wheel (not shown) into lateral movement of a pair of tie rods. The steering gear 14 is mounted to the frame 12. In the configuration illustrated in FIGS. 1 and 2, the steering gear 14 is a power steering gear and includes an electric motor that selectively amplifies forces transferred to the tie rods. Although the steering assembly 10 is illustrated as rack and pinion, other configurations may alternatively be utilized within the scope of the disclosure herein, such as, for example and without limitation, electronic steering assemblies and steering assemblies for autonomous vehicles that may or may not include a steering wheel.

With reference to FIG. 3, in one embodiment, the steering gear 14 includes a steering gear housing 141 enclosing a steering rack 142. The steering rack 142 is coupled to a tie rod 152. A pair of rack boot assemblies 16 enclose the joint between the tie rod 152 and the steering rack 142. In one embodiment, each rack boot assembly 16 is a two component design that includes a first boot 162 and a second boot 164. The first boot 162 is disposed inward of the second boot 164, and, in some embodiments, the first boot 162 is completely enclosed by the second boot 164. That is, the first boot 162 is proximate to the tie rod 152 and the steering rack 142.

In one embodiment, the first boot 162 and the second boot 164 define a space or void 163 therebetween. In some embodiments, the void 163 is filled with a material (e.g., a powder, liquid, or foam). If exposed to moisture, the material within the void 163 increases in viscosity or stiffens, increasing the overall stiffness feel of the steering gear 14, thereby notifying the vehicle operator of a possible issue with the steering gear 14.

In some embodiments, an air transfer member 170 fluidly connects the void 163 of one of the rack boot assemblies 16 with the void of the other rack boot assembly 16, as best shown in FIG. 2. In some embodiments, the air transfer member 170 is a tube that allows the transfer of fluid, such as air, between the voids 163.

Figure 4:
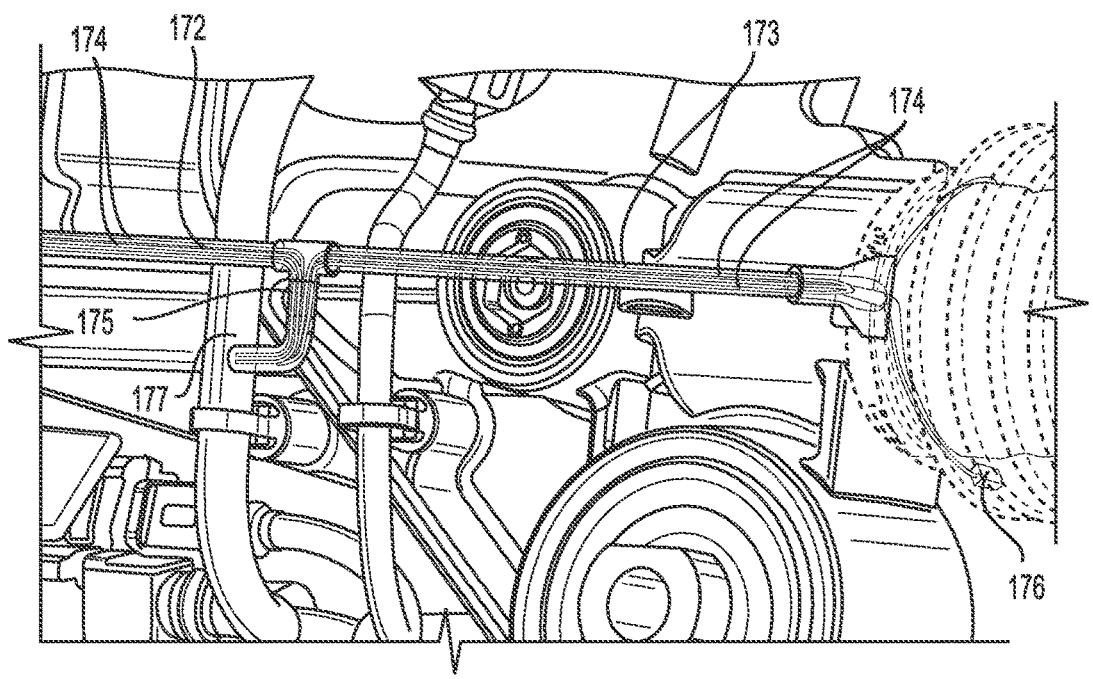
FIG. 4 is a schematic view of a portion of the steering assembly of FIGS. 1 and 2, according to another embodiment.

With continued reference to FIGS. 3 and 4, in some embodiments, each of the rack boot assemblies 16 also includes a sensing assembly 172. The sensing assembly 172 includes, in some embodiments, a protective member 173 which may be a tube that encloses one or more wires 174 connected to a sensor 176. The sensor 176 is disposed within the void 163, that is, in the space between the first boot 162 and the second boot 164. The sensor 176 is configured to detect moisture within the void 163. The sensor 176 is coupled, in some embodiments, to an electronic control unit (ECU) of the electric power steering (EPS) system of the vehicle.

In some embodiments, each of the rack boot assemblies 16 includes the sensor 176 disposed between the first and second boots 162, 164. As shown in FIG. 1, the protective member 173 extends between the two rack boot assemblies 16 to enclose and protect the wires connected to the sensors 176. In some embodiments, as shown in FIG. 4, a coupling member 175 connects the protective member 173 with a wiring harness 177 such that the wires 174 from the sensors 176 are connected to the EPS ECU via the wiring harness 177.

Figure 5:
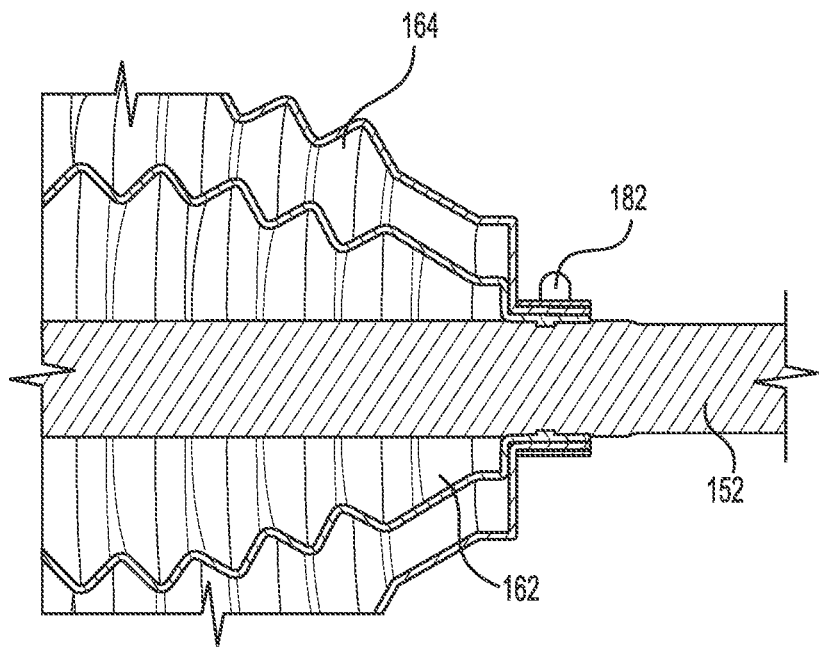
FIG. 5 is a schematic, cross-sectional view of a portion of a boot assembly for the steering assembly of FIGS. 1 and 2, according to an embodiment.
Figure 6:
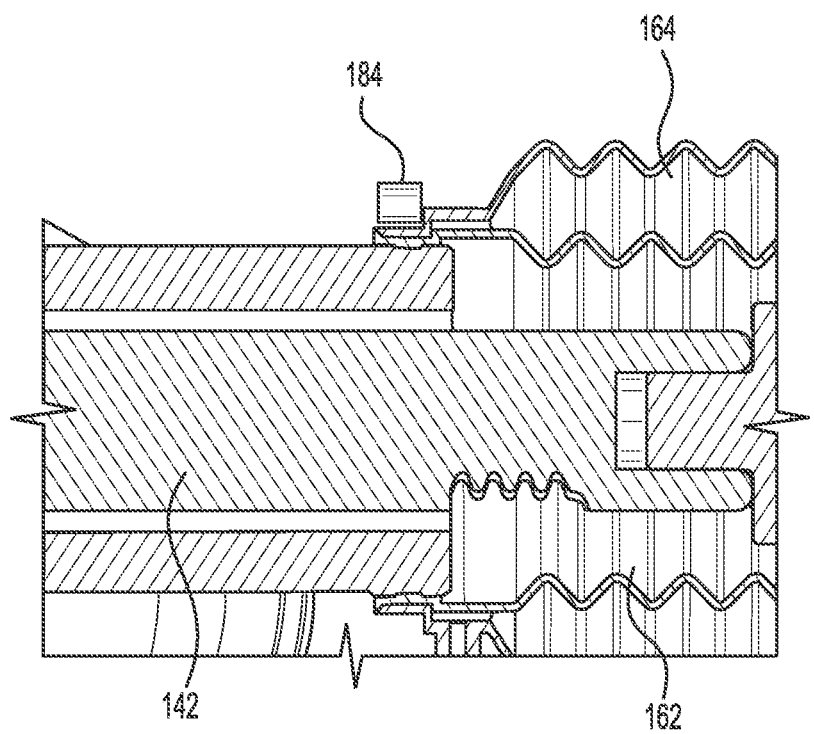
FIG. 6 is schematic, cross-sectional view of another portion of a boot assembly for the steering assembly of FIGS. 1 and 2, according to an embodiment.

With reference to FIGS. 5 and 6, in some embodiments, a first clamping member 182 clamps one end of both of the first and second boots 162, 164 to the tie rod 152. The first clamping member 182 may be any mechanical clamp to secure the boots 162, 164 to the tie rod 152 and prevent the intrusion of moisture or other contaminants into the joint. A second clamping member 184 secures the opposite end of both of the boots 162, 164 to the steering gear housing 141 and similarly prevents the intrusion of moisture or other contaminants into the joint.

Figure 7:
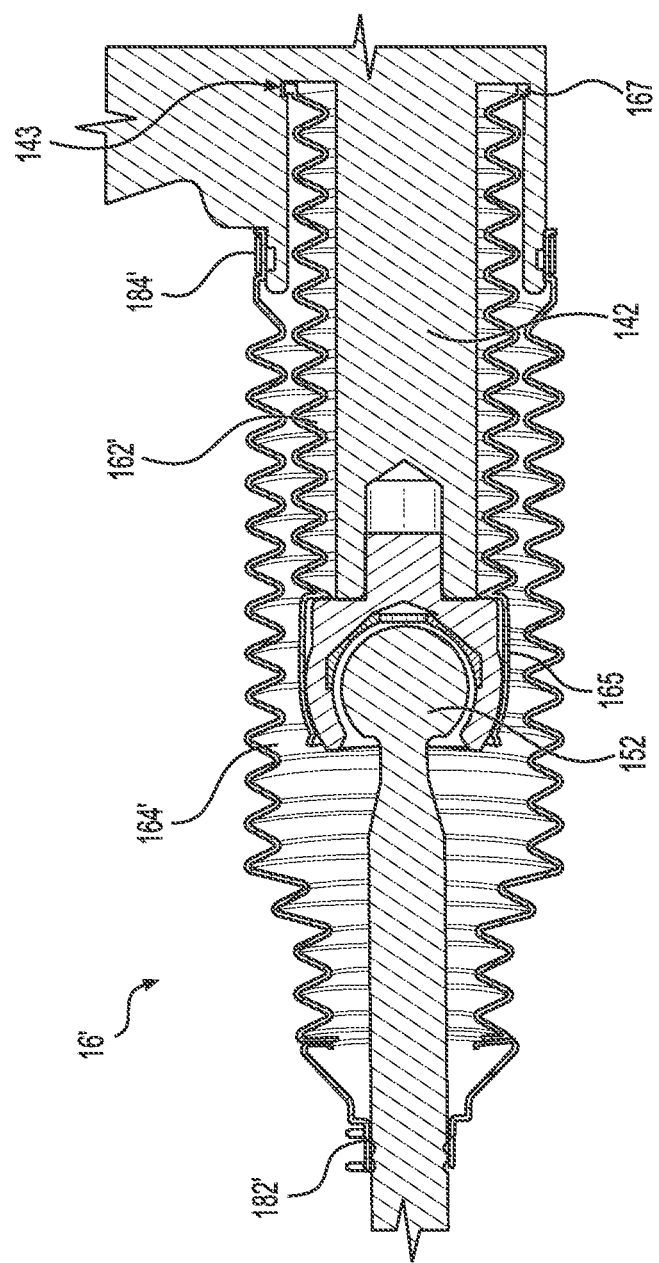
FIG. 7 is a schematic, cross-sectional view of a boot assembly for a steering assembly, according to an embodiment.

In another embodiment of a rack boot assembly 16' having a single component, dual wall design, shown in FIG. 7, a first boot 162' and a second boot 164' enclose and protect the joint between the tie rod 152 and the steering rack 142. The first boot 162' is disposed proximate to the steering rack 142. A first end 165 of the first boot 162' is configured to engage with the tie rod 152, such as with a snap fit engagement. In some embodiments, the steering gear housing 141 includes an engagement portion 143. In some embodiments, the engagement portion 143 is configured to receive a second end 167 of the first boot 162', such as with a snap fit engagement.

The second boot 164' encloses and surrounds the first boot 162' and the joint between the tie rod 152 and the steering rack 142. In some embodiments, the second boot 164' is mechanically coupled to the tie rod 152 with a first clamp 182' and is coupled to the steering rack 142 with a second clamp 184'. While FIG. 7 illustrates two clamps 182' and 184', any mechanical fastener such as, for example and without limitation, a clip, may be used to secure the first and second ends of the first and second boots to the steering gear components to prevent the intrusion of water or other contaminants into the rack boot assembly. In some embodiments, the first boot 162' is offset from the second boot 164' along a longitudinal axis defined by the steering gear 14.

In some embodiments, as shown in FIGS. 1-7, the first boots 162, 162' and the second boots 164, 164' are accordion-style steering rack boots. However, in other embodiments the first boots 162, 162' and the second boots 164, 164' may be of any style known to those skilled in the art.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A steering assembly for a vehicle, the steering assembly comprising:
    a steering gear including a steering gear housing enclosing a steering rack, the steering rack coupled to a tie rod at a joint;
    at least one boot assembly configured to enclose the joint between the steering rack and the tie rod, each boot assembly comprising:
        a first boot proximate to the joint; and
        a second boot disposed outward of the first boot and defining a void between the first boot and the second boot; and
    a material disposed within the void, the material including one or more of a powder, liquid, or foam configured to increase in viscosity when exposed to moisture.

2. The steering assembly of claim 1 wherein the at least one boot assembly includes a first boot assembly and a second boot assembly, and an air transfer member fluidly connects the first boot assembly and the second boot assembly.

3. The steering assembly of claim 2, wherein the first boot assembly comprises the first boot and the second boot defining a first void of the first boot assembly and the second boot assembly comprises a third boot and a fourth boot defining a second void of the second boot assembly and the air transfer member fluidly connects the first and second voids of the first and second boot assemblies.

4. The steering assembly of claim 1, further comprising a sensing assembly, the sensing assembly comprising a sensor disposed within the void between the first and second boots of the at least one boot assembly.

5. The steering assembly of claim 4, wherein the sensing assembly is electrically coupled to an electronic control unit of an electric power steering system.

6. The steering assembly of claim 1, wherein the first boot includes a first end coupled to the tie rod and a second end coupled to the steering gear housing.

7. The steering assembly of claim 6, wherein the first end of the first boot has a snap fit engagement with the tie rod and the second end of the first boot has a snap fit engagement with an engagement portion of the steering gear housing.

8. The steering assembly of claim 6, wherein the first boot is offset from the second boot along a longitudinal axis defined by the steering gear.

9. The steering assembly of claim 1, wherein a first end of the first boot and a first end of the second boot are radially aligned and a second end of the first boot and a second end of the second boot are radially aligned.

10. A steering assembly for a motor vehicle, the steering assembly comprising:
a steering gear including a steering rack coupled to a tie rod at a joint;
at least one boot assembly configured to enclose the joint between the steering rack and the tie rod, each boot assembly comprising:
a first boot proximate to the steering rack;
a second boot disposed outward of the first boot such that a space is defined between the first and second boots; and
a sensing assembly disposed in the space between the first boot and the second boot;
wherein the sensing assembly includes a sensor configured to detect a moisture level in the space between the first and second boots.

11. The steering assembly of claim 10, further comprising a first boot assembly and a second boot assembly and an air transfer member fluidly connecting the first boot assembly and the second boot assembly.

12. The steering assembly of claim 10, further comprising a material disposed within the space between the first boot and the second boot of the at least one boot assembly, the material configured to increase in viscosity when exposed to moisture.

13. The steering assembly of claim 10, wherein a first end of the first boot has a snap fit engagement with the tie rod and a second end of the first boot has a snap fit engagement with an engagement portion of the steering gear housing.

14. The steering assembly of claim 10, wherein the sensor is electrically coupled to an electronic control unit of an electric power steering system.

* * * * *